3,378,345
PROCESS FOR PRODUCING PYROLYTIC
GRAPHITE WHISKERS
Romeo G. Bourdeau, Brookline, and Frank E. Papalegis, Woburn, Mass., assignors, by mesne assignments, to Union Carbide Corporation, a corporation of New York
No Drawing. Continuation-in-part of application Ser. No. 413,637, Nov. 24, 1964. This application Mar. 22, 1965, Ser. No. 441,885
3 Claims. (Cl. 23—209.1)

ABSTRACT OF THE DISCLOSURE

A process is provided for producing graphite whiskers which comprises passing a hydrocarbon gas and an active gas, viz, carbon dioxide or water, in a volume ratio ranging between about 10 to 400 parts hydrocarbon gas to one part active gas through a pyrolysis zone having a substrate therein for the growth of whiskers thereon, the pyrolysis zone being maintained at a pressure less than atmospheric with the temperature in the pyrolysis zone initially being maintained above about 700° C. to promote nucleation of the whiskers and thereafter maintained above about 1200° C. to provide for whisker growth.

---

This is a continuation-in-part of application Ser. No. 413,637, filed Nov. 24, 1964, now abandoned.

The present invention is concerned with pyrolytic graphite whiskers or filaments and, more particularly, with improved processes for producing such pyrolytic graphite whiskers through the decomposition of hydrocarbons.

Graphite whiskers have been prepared by the decomposition of various hydrocarbons on heated substrates, e.g., graphite or carbon surfaces. Usually the yields and the physical properties, e.g., the crystalline structure, diameters, length, tensile strengths, Young's modulus, etc., of the whiskers have been erratic and unpredictable.

One object of the present invention is to provide processes for producing pyrolytic graphite whiskers or fibers in substantial quantities.

Another object of the present invention is to provide a process for producing pyrolytic graphite whiskers having small diameter to length ratios.

Still another object of the present invention is to provide processes for producing pyrolytic graphite whiskers having high tensile strengths and moduli of elasticity.

A further object is to provide processes which are more consistent and which produce whiskers having more uniform qualities.

Other objects of the invention will in part be obvious and will in part appear hereinafter.

The invention accordingly comprises the processes involving the several steps and the relation and order of one or more of such steps with respect to each of the others, and the products possessing the features, properties, and the relation of elements which are exemplified in the following detailed disclosure, and the scope of the application of which will be indicated in the claims.

For a fuller understanding of the nature and objects of the invention, reference should be had to the following detailed description.

It has been found that substantial improvements in the consistency and quality of pyrolytic graphite whiskers or filaments, as well as the yields, may be made by carrying out the thermal decomposition of the hydrocarbons in the presence of an active gas selected from the group consisting of carbon dioxide and precursors of carbon dioxide, i.e., materials which under the reaction conditions will generate or interact with the hydrocarbons to produce carbon dioxide, e.g., water and oxygen containing organic compounds, e.g., methylol. The preferred active gases are carbon dioxide, water, or combinations of carbon dioxide and water. Carbon dioxide is especially convenient to use in that it can easily be metered into the system.

Usually the amount of active gas employed may be varied to suit particular needs. In preferred embodiments, the ratio by volume of the hydrocarbon gas to the active gas is at least 10:1, and generally between about 10:1 to about 400:1. Especially good results are obtained when the ratio by volume of the hydrocarbon gas to the active gas is at least 25:1 and more particularly between about 25–50:1, i.e., 25 to 50 parts by volume of the hydrocarbon gas to one part by volume of the active gas.

It has been generally found under the process conditions employed that nucleation of the whiskers will take place in the 700° C. to 1200° C. range, but slight, if any, growth of the whiskers will take place at these temperatures. For best growth it is preferable that the process be carried out at a temperature of at least 1200° C. and, more preferably, at a temperature of at least 1400° C. The preferred temperature range lies between about 1200–2500° C. and, more particularly, between about 1400–2000° C.

In one of the preferred modes of carrying out the processes of the present invention the process is initially started below 1200° C., e.g., in the 700 to 1200° C. range and the temperature is raised to at least 1200° C. and preferably to at least 1400° C. Usually the rate at which the temperature is raised may be varied to suit particular needs. Usually raising the temperature at rates from about 1° C. to about 20° C. per minute will provide particularly useful results. Especially good results are obtained when the temperature is raised about 3° C. per minute.

As stated above, the active gas may be selected from carbon dioxide or precursors of carbon dioxide, i.e., materials such as water, oxygen containing organic compounds, etc., which under the reaction conditions generate or will combine with the hydrocarbons to generate carbon dioxide. The following equation illustrates the reaction of water with methane at 900° C. and reduced pressure to produce carbon dioxide:

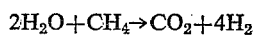
$$2H_2O + CH_4 \rightarrow CO_2 + 4H_2$$

In prefered embodiments of the present invention the process is carried out at reduced pressures, i.e., at less than atmospheric pressure, and, more preferably, at pressures of less than 100 mm. of mercury. It should be understood that whiskers may be produced at higher pressures but that they sometimes tend to be amorphous and lack the high strength of the more crystalline materials produced at reduced pressure. Particularly good results are obtained at pressures of 0.1 to 20 mm. of mercury.

The processes may be carried out in any closed chamber which is equipped with means for providing the desired temperatures and which is also provided with suitable inlets for feeding the reactants. The chamber preferably should be of pressure-proof structure and be connected with means for reducing the pressure therein. Any suitable surface, e.g., carbon, graphite, tantalum, etc., may be used for the deposition of the whiskers. The growth of the whiskers generally proceeds in the direction of the gas flow and is usually greatest when the growing whisker is close to a hot surface or in an area wherein it can receive large amounts of radiant energy. Good results have been obtained by nucleating and growing the whiskers on a mandrel comprising a plurality of closely spaced, e.g., two inches apart, horizontal plates.

The flow rate of the gases through the reaction chamber can generally be varied to suit particular needs. Of course such rates will be dependent upon the size of the reaction chamber employed. Flow rates of 2.5 to 30 liters per minute were used for a cylindrical reaction chamber 8 inches in diameter and 13 inches long with good results. It was generally found that the number of whiskers, their diameters and their surface smoothness increased with increasing flow rates. Particularly good results were obtained using a flow rate of 16 liters per minute for a reaction chamber the size set forth above.

The hydrocarbons for use in the processes of the present invention may be selected from any of the materials of this nature available. As examples of typical materials, mention may be made of alkanes such as methane, ethane, propane; cycloalkanes such as cyclopropane; and aromatics such as benzene. Particularly useful results were obtained with methane.

The following nonlimiting examples illustrate the processes of the present invention.

Example 1

Methane gas was passed through a water bath held at 150° F. and into a reaction chamber, such as described above, at a rate of 5 liters per minute over a period of 90 minutes. Water was transferred into the chamber at a rate of about 0.2 cc. per minute. During the reaction period the temperature in the reaction chamber varied between 800° C. to 1990° C. and the pressure varied between 174.0 to 6.2 mm. A high concentration of 10–45 micron diameter whiskers were produced having lengths up to 2 to 3 inches.

Example 2

Methane gas was passed through a water bath held at a temperature of 150° F. and fed into a pyrolysis zone at a rate of 5 liters per minute over a period of 90 minutes. Water was transferred into the zone at a rate of about 0.2 cc. per minute. Before entering the reaction chamber the methane gas was also admixed with carbon dioxide which was metered in at 0.013 liter per minute. The ratio by volume of methane to carbon dioxide fed was about 385 to 1. During the reaction the temperature was gradually raised from 700 to 1810° C. and the pressure was held between about 0.95 to 2.6 mm. A high concentration of whiskers were produced on the lower plates of the mandrel.

Example 3

The reaction was carried out in a manner similar to Example 2 except that the methane was not passed through water and the pressure was held between about 1.4 to 2.4 mm. The ratio by volume of methane for carbon dioxide fed into the pyrolysis zone was about 385 to 1. A high concentration of whiskers were obtained having lengths up to 2 inches and diameters from 10 to 35 microns.

Example 4

Methane gas metered at 16 liters per minute and carbon dioxide gas metered at 0.1 liter per minute were fed into the reaction chamber over a period of 180 minutes. The ratio by volume of methane to carbon dioxide was thus 160 to 1. During the reaction the temperature was gradually raised from 910 to 1500° C. and the pressure was held between 5.1 to 6.9. A high concentration of whiskers were obtained.

Example 5

The reaction was carried out in a manner similar to Example 4 except that the carbon dioxide was metered in at a rate of 0.32 liter per minute and the temperature was raised during the reaction period at a rate of about 3° C. per minute from about 805 to 1400° C. The ratio by volume of methane to carbon dioxide in this run was thus 50 to 1. A high concentration of 5–15 micron diameter whiskers were obtained having lengths up to 2 inches.

Example 6

Methane gas metered at 10.0 liters per minute and carbon dioxide gas metered at 0.4 liter per minute were fed into the reaction chamber over a period of 180 minutes. The ratio by volume of methane to carbon dioxide was thus 25 to 1. During the reaction the temperature was raised at about 3° C. per minute from 800° C. to 1400° C. and the pressure was held between 2.6 to 4.1 mm. The whiskers obtained, which had lengths of about ½ inch and diameters of 2 to 5 microns, had especially good strengths.

Generally, the tensile strength and Young's modulus of the whiskers of filamentary material of the present invention increased as the diameters decreased. Whiskers having diameters of 2.5 to 5 microns, had tensile strengths from 400,000 p.s.i. to as high as 641,000 p.s.i. and Young's modulus approaching $60 \times 10^6$ p.s.i. ($57.7 \times 10^6$ p.s.i.). Whiskers, having diameters of 5 to 10 microns, had tensile strengths from 275,000 to 400,000 p.s.i. and Young's modulus up to $30 \times 10^6$ p.s.i., e.g., a Young's modulus of $29 \times 10^6$ p.s.i. was obtained for a whisker having a diameter of 7.63 microns. Whiskers, having diameters of 10 to 25 microns had tensile strengths from 150,000 p.s.i. to 275,000 p.s.i. and Young's modulus up to $30 \times 10^6$ p.s.i.

The whiskers produced according to the processes of the present invention may be used as high temperature resistant filamentary reinforcements in end uses such as erosion resistant ablative heat shields.

Since certain changes may be made in the above processes and products without departing from the scope of the invention herein involved, it is intended that all matter contained in the above description shall be interpreted as illustrative and not in a limiting sense.

What is claimed is:

1. A process for making graphite whiskers which comprises passing a hydrocarbon gas and at least one active gas selected from the group consisting of carbon dioxide and water through a pyrolysis zone having a substrate therein for the nucleation and growth of said whiskers, the ratio by volume of said hydrocarbon gas to said active gas ranging between about 10 to about 400 parts of hydrocarbon gas to 1 part of the active gas, said pyrolysis zone being maintained at a pressure less than atmospheric, the temperature in said pyrolysis zone initially being maintained between about 700° C. and 1200° C. to promote nucleation of the whiskers and thereafter maintained above about 1200° C. to provide for whisker growth.

2. A process for making graphite whiskers which comprises passing a hydrocarbon gas and at least one active gas selected from the group consisting of carbon dioxide and water through a pyrolysis zone having a substrate therein for the nucleation and growth of said whiskers, the ratio by volume of said hydrocarbon gas to said active gas ranging between about 10 to about 400 parts of the hydrocarbon gas to 1 part of the active gas, said pyrolysis zone being maintained at a pressure below about 100 mm. of mercury, the temperature of said pyrolysis zone being gradually raised from about 700° C. to at least 1400° C.

3. A process for making graphite whiskers having diameters of less than about 50 microns produced by passing a hydrocarbon gas and an active gas selected from the group consisting of carbon dioxide and water through a pyrolysis zone having a substrate therein for the nucleation and growth of said whiskers, the ratio by volume of said hydrocarbon gas to said active gas ranging between about 10 to about 400 parts of the hydrocarbon gas to one part of the active gas, said pyrolysis zone being maintained at a pressure below about 100 mm. of mercury, the temperature of said pyrolysis zone initially being maintained between about 700° C. and 1200° C. to promote nucleation of the whiskers and thereafter maintained above about 1200° C. to provide for whisker growth.

References Cited

UNITED STATES PATENTS

| | | | |
|---|---|---|---|
| 2,796,331 | 6/1957 | Kauffman et al. | 23—209.4 |
| 3,107,180 | 10/1963 | Diefendorf | 117—226 |
| 3,172,774 | 3/1965 | Diefendorf | 23—209.4 X |

OTHER REFERENCES

"Chemical Engineers Handbook," John H. Perry, editor, McGraw-Hill Book Co., 1950, p. 1577.

EDWARD J. MEROS, *Primary Examiner.*